US009836400B2

(12) United States Patent
Wang et al.

(10) Patent No.: US 9,836,400 B2
(45) Date of Patent: Dec. 5, 2017

(54) METHOD, APPARATUS AND SYSTEM FOR DYNAMICALLY CONTROLLING AN ADDRESSING MODE FOR A CACHE MEMORY

(71) Applicant: Intel Corporation, Santa Clara, CA (US)

(72) Inventors: Kebing Wang, Shanghai (CN); Zhaojuan Bian, Shanghai (CN); Wei Zhou, Shanghai (CN); Zhihong Wang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 288 days.

(21) Appl. No.: 14/126,921

(22) PCT Filed: Oct. 31, 2013

(86) PCT No.: PCT/CN2013/086281
§ 371 (c)(1),
(2) Date: Dec. 17, 2013

(87) PCT Pub. No.: WO2015/062006
PCT Pub. Date: May 7, 2015

(65) Prior Publication Data
US 2015/0120998 A1    Apr. 30, 2015

(51) Int. Cl.
*G06F 12/08*   (2016.01)
*G06F 12/084*   (2016.01)
(Continued)

(52) U.S. Cl.
CPC ........ *G06F 12/084* (2013.01); *G06F 12/0811* (2013.01); *G06F 12/0833* (2013.01);
(Continued)

(58) Field of Classification Search
CPC ............ G06F 12/0811; G06F 12/0833; G06F 12/084; G06F 2212/283; G06F 2212/621; Y02B 60/1225
See application file for complete search history.

(56) References Cited

U.S. PATENT DOCUMENTS 6,457,107 B1    9/2002  Wynn et al.
7,853,755 B1 *  12/2010 Agarwal ............. G06F 12/0811
                                                711/141
(Continued)

FOREIGN PATENT DOCUMENTS

CN    103235764 A    8/2013
CN    103370696 A    10/2013

OTHER PUBLICATIONS

International Searching Authority, "Notification of Transmittal of the International Search Report and the Written Opinion of the International Searching Authority," dated Aug. 4, 2014, in International application No. PCT/CN2013/086281.
(Continued)

*Primary Examiner* — Aracelis Ruiz
(74) *Attorney, Agent, or Firm* — Trop, Pruner & Hu, P.C.

(57) ABSTRACT

In an embodiment, a first portion of a cache memory is associated with a first core. This first cache memory portion is of a distributed cache memory, and may be dynamically controlled to be one of a private cache memory for the first core and a shared cache memory shared by a plurality of cores (including the first core) according to an addressing mode, which itself is dynamically controllable. Other embodiments are described and claimed.

27 Claims, 7 Drawing Sheets

(51) Int. Cl.
*G06F 12/0831* (2016.01)
*G06F 12/0811* (2016.01)

(52) U.S. Cl.
CPC .. *G06F 2212/283* (2013.01); *G06F 2212/621* (2013.01); *Y02B 60/1225* (2013.01)

(56) References Cited

U.S. PATENT DOCUMENTS

| | | | | |
|---|---|---|---|---|
| 2002/0016891 | A1* | 2/2002 | Noel | G06F 9/5077 711/153 |
| 2002/0174301 | A1* | 11/2002 | Conway | G06F 12/084 711/129 |
| 2008/0022049 | A1* | 1/2008 | Hughes | G06F 12/084 711/130 |
| 2013/0111121 | A1 | 5/2013 | Ananthakrishnan et al. | |

OTHER PUBLICATIONS

Korea Intellectual Property Office, Office Action dated Feb. 19, 2017 in Korean Patent Application No. 20167007870.
European Patent Office, Extended European Search Report dated Jun. 16, 2017 in European Patent Application No. 13896764.1.

\* cited by examiner

METHOD, APPARATUS AND SYSTEM FOR DYNAMICALLY CONTROLLING AN ADDRESSING MODE FOR A CACHE MEMORY

TECHNICAL FIELD

This disclosure pertains to computing systems, and in particular (but not exclusively) to cache memory management.

DETAILED DESCRIPTION

Figure 1:
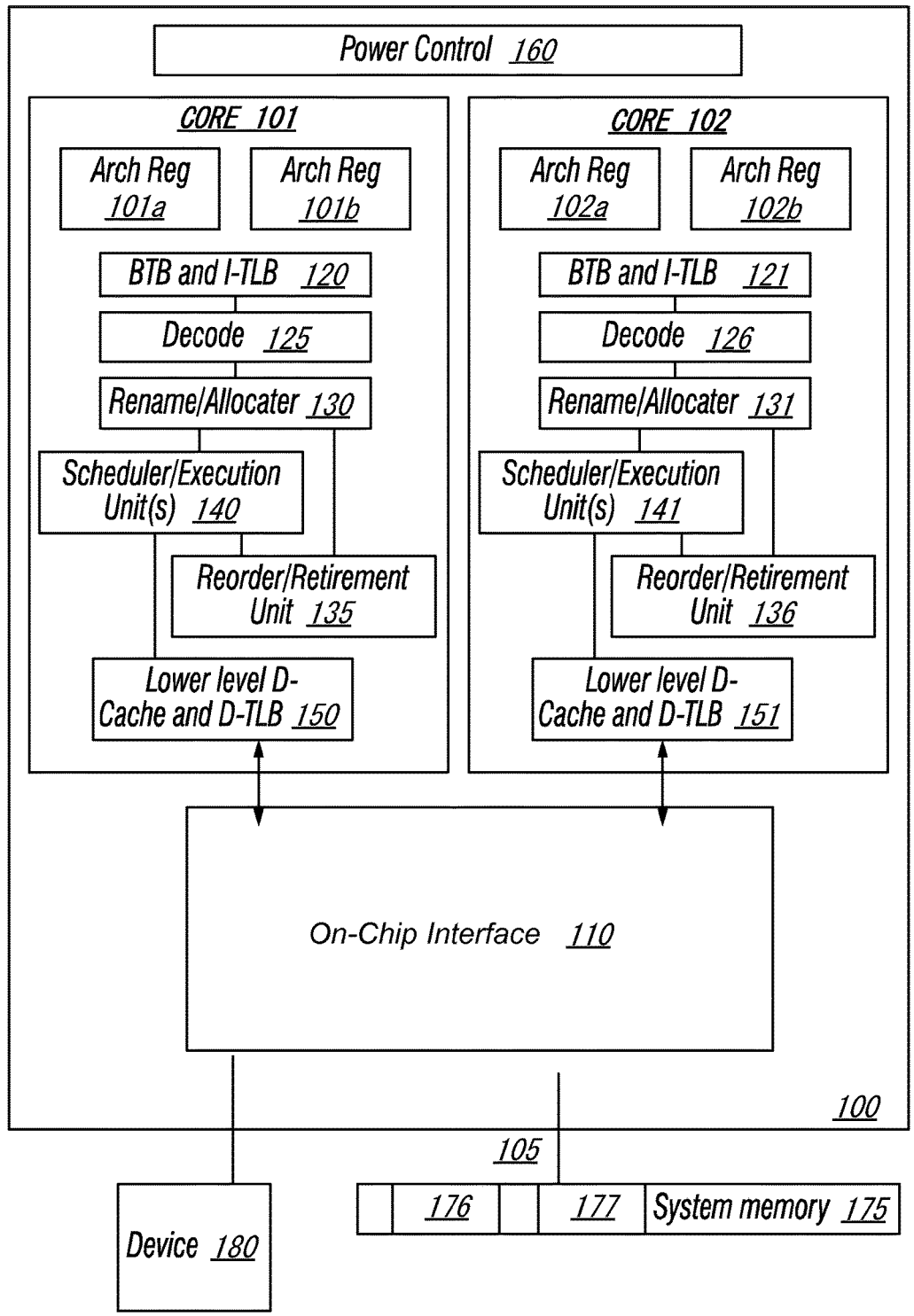
FIG. 1 is a block diagram of a computing system including a multicore processor.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or uncore configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

As greater numbers of cores are integrated into a single processor or system-on-chip (SoC), core interconnection and cache memory organization become one determinative of performance. On-chip communication fabrics have various interconnection topologies, such as full ring and mesh topologies. In most communication fabrics, each interconnect stop is shared by a core and a local last level cache (LLC) portion or slice. These LLC slices may be dynamically controllably organized as a private cache memory for a single core or a shared cache memory. In private mode, the data used by a core is placed in its local LLC slice and the access latency is low. But in private mode, a core can only access a small portion of the LLC, and coherent traffic overhead is introduced, which may occupy a significant part of uncore interconnection bandwidth. On the other hand, a shared mode makes the entire LLC accessible to all cores. However, since requested data of a core could be in the LLC slice of a remote node, access latency can be very high.

Group sharing is a tradeoff mode between private and shared modes. In the group sharing mode, LLC slices are organized into a plurality of groups. LLC slices of a group are shared between the cores associated with these slices, but LLC slices of different groups are private with respect to cores outside of a given group. Each core can access LLC slices of its neighboring node(s) of the same group, and cache coherence is maintained among different groups. Currently, most group sharing modes are implemented by a physical communication fabric, which is not flexible and scalable. Instead, the given grouping is fixed on manufacture. Moreover, current group sharing modes do not solve the coherent traffic issues.

Embodiments enable dynamic sharing of a shared cache memory according to a group sharing mode in which an identifier of a node (node ID) is included as part of the addressing scheme to address the LLC. As an example, this identifier can be included within an LLC index to implement a group sharing LLC. Note further that this node ID may be independent of other indicators used to identify a given node, as the node IDs used herein are transparent to system software and thus are distinct from core identifiers, advanced programmable interrupt controller (APIC) IDs, or other identifiers used by hardware or software of a system. Further, understand that this node ID is associated with all of a node and its included components, including core and LLC slice.

Using a node identifier as part of a LLC hash index algorithm, LLC slices can be divided into several groups based at least in part on their node IDs. Then, LLC slices of a single group are shared internally as a group, and privately among different groups. Also in various embodiments, the grouping mode can be flexible to dynamically adjust a size of one or more of the groups based on various performance characteristics, such as workload runtime profiling (regarding workload characteristics), interconnect traffic, and so forth. Other examples include LLC access/miss rate, state statistics of cache lines, and so forth. Embodiments also enable savings on cache coherence traffic.

Figure 2:
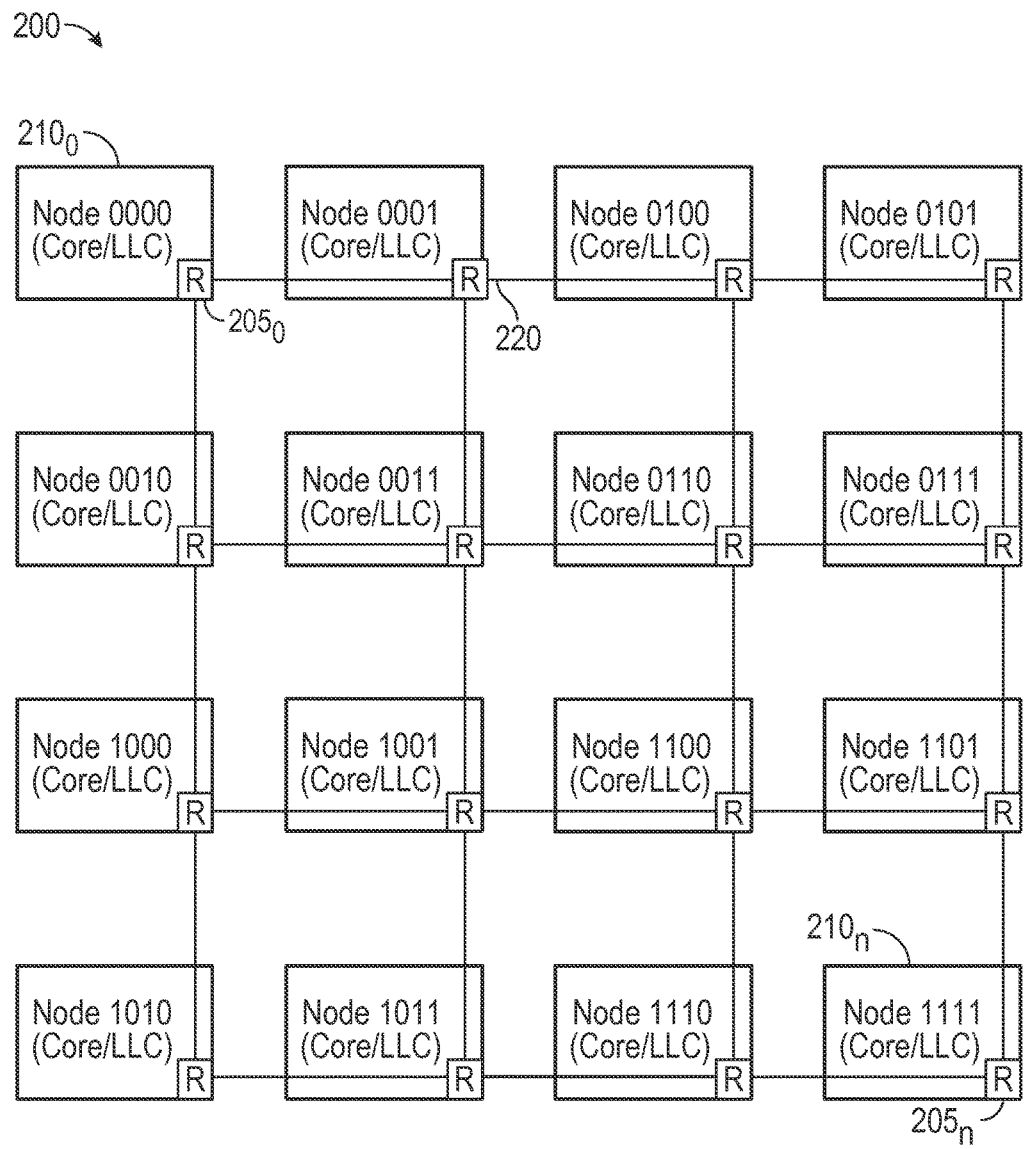
FIG. 2 is a block diagram of a multicore processor in accordance with an embodiment of the present invention.

To better understand the context in which the dynamic cache grouping occurs, reference is made to FIG. 2. In FIG. 2, a processor 200 is illustrated at a high level. In different embodiments, processor 200 may take the form of a multi-core processor, e.g., formed on a single semiconductor die or another type of multicore processor. Processor 200 in another embodiment may be a SoC also formed on a single semiconductor die.

In the high level shown in FIG. 2, a plurality of nodes $210_0$-$210_n$ are present. Understand that the number of such nodes may vary depending on the embodiment. For purposes of discussion herein, assume 16 nodes. Of course in other embodiments greater or fewer numbers of individual nodes may be present. A node is equally referred to herein as a tile, which may include at least one processing element and one or more levels of a cache memory hierarchy. In the embodiment of FIG. 2, each node 210 includes a processor core and/or other dedicated processing circuitry such as a fixed function processing unit. In different embodiments, the processing cores may be heterogeneous or homogeneous.

In addition, each node 210 includes at least a portion of a cache hierarchy. For example, in an embodiment each node includes a private cache memory that is only accessed by the local core. Furthermore, each node also includes a portion of a shared cache memory such as a portion of a LLC. Each node 210 further includes a router 205 that is configured to enable communications with other elements of the processor via an interconnect fabric 220. In the embodiment shown in FIG. 2, interconnect fabric 220 is a two-dimensional mesh interconnect. However understand that different types of interconnects, including another type of mesh topology, ring topology, three-dimensional topology or so forth instead may be present.

In the embodiment shown in FIG. 2, each node 210 is associated with a node identifier that uniquely identifies the corresponding node. Details of this node ID generation and use are described herein with regard to the dynamic cache grouping arrangement. Of course while shown at this high level in the embodiment of FIG. 2, understand that additional circuitry also may be present. For example, not shown for ease of illustration in FIG. 2 is an uncore portion of the processor that includes circuitry unrelated to the core operations. Such circuitry may include off-chip interfaces, power control mechanisms, among many other peripheral devices.

Figure 3:
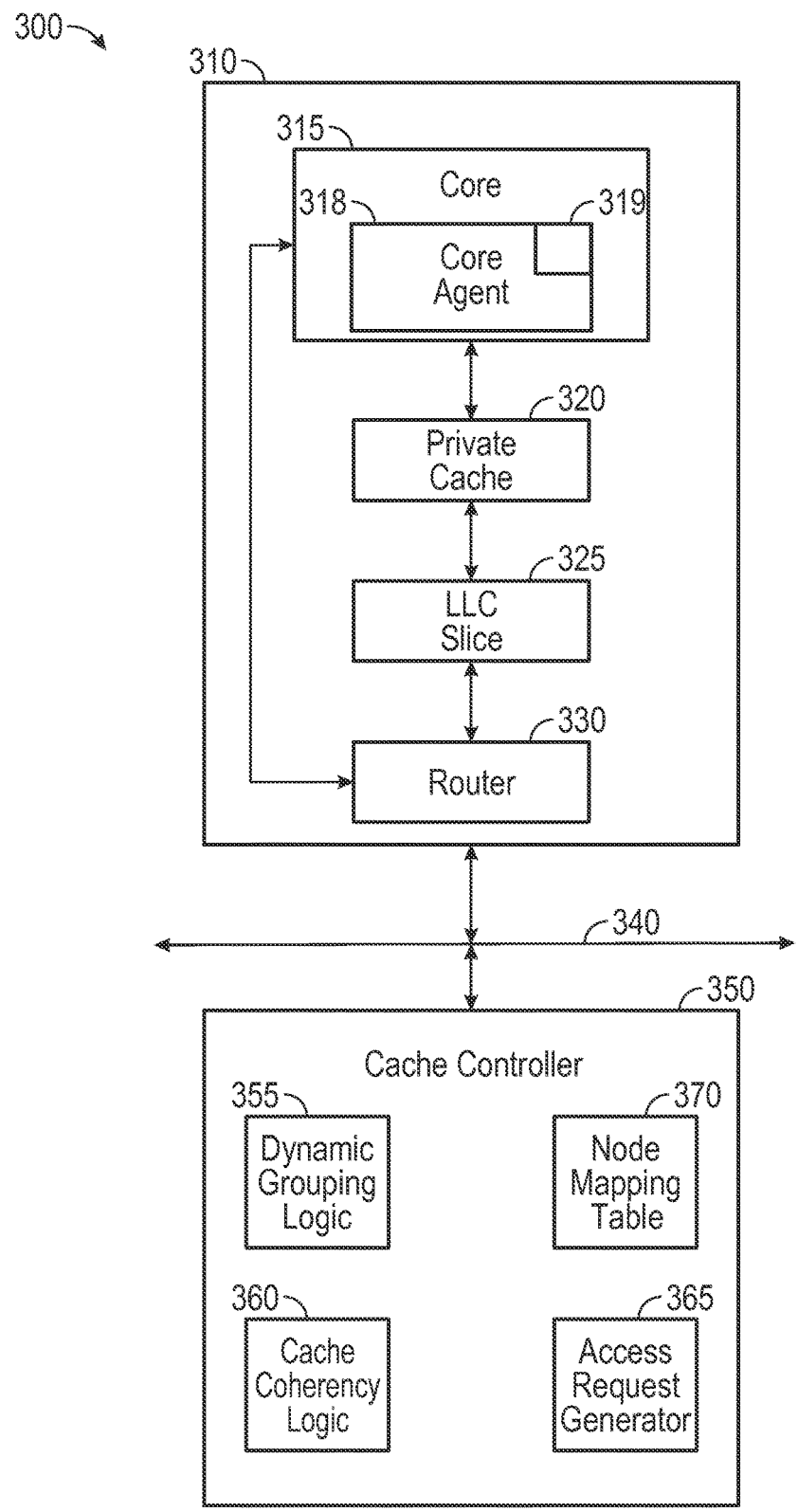
FIG. 3 is a block diagram of a portion of a processor in accordance with an embodiment.

As a further illustration of a processor arrangement, reference is now made to FIG. 3, which is a block diagram of a portion of a processor in accordance with an embodiment. As shown in FIG. 3, processor 300 is shown at a more detailed level. Specifically, shown in the embodiment of FIG. 3 is a single node or tile 310 coupled to an interconnect fabric 340 that in turn is coupled to a cache controller 350. Understand that while cache controller 350 is shown as a single independent circuit, in other embodiments the cache controller can be distributed throughout the different tiles of the processor.

In the embodiment of FIG. 3, tile 310 includes a core 315 which may be a multithreaded processor core, in some embodiments. For performing the dynamic cache control described herein, core 315 has a core agent 318, which may be hardware, software, firmware or combinations thereof, including logic to perform dynamic cache addressing using a node ID of the tile, which may be stored in a local storage 319, such as a register. To enable rapid access to requested data, core 315 is coupled to a private cache 320 that is to store data for use only by core 315. In another embodiment, private cache 320 may be internal to core 315 and another level of a multilevel cache hierarchy may couple between core 315 and a LLC. The embodiment shown in FIG. 3 is a multi-level cache hierarchy in which private cache 320 is coupled to an LLC 325 which is an individual portion of a distributed shared cache memory included in tile 310. In dynamic operation, LLC slice 325 may be dynamically configured as a private cache accessible only to core 315 or may be dynamically configured as a shared cache that is accessible to multiple cores of a group. Thus the different modes of operation and arrangement of the slice as private or shared occurs dynamically during system operation.

To enable communications with other portions of processor 300, tile 310 further includes a router 330 configured to communicate transactions and other information between components within tile 310 and other tiles and other circuitry of processor 300.

Still referring to FIG. 3, tile 310 is coupled to cache controller 350 via interconnect fabric 340. In general, cache controller 350 includes control logic to control operation of at least the distributed LLC. To this end, cache controller 350 includes a dynamic grouping logic 355 which in general is configured to perform dynamic cache slice grouping as described herein. Furthermore, cache controller 350 includes a cache coherency logic 360 which may be configured to perform cache coherent operations to ensure that the view of data throughout the processor remains coherent. Cache controller 350 further includes an access request generator 365 that is configured to generate access requests for different portions of the cache memory. As will be described herein generator 365 may generate access requests having access addresses that leverage the node ID-based addressing scheme described herein. A node mapping table 370 may include an entry for each node and which identifies the current node ID for the corresponding node. Understand that although shown at this high level in the embodiment of FIG. 3, the scope of the present invention is not limited in this regard.

Different manners of including a node identifier within a cache memory addressing scheme may be realized in different embodiments. However, for purposes of illustration in one embodiment a global set index of a cache slice may be as follows: Global LLC Set Index=Local LLC Set Index+node ID.

Figure 4A:
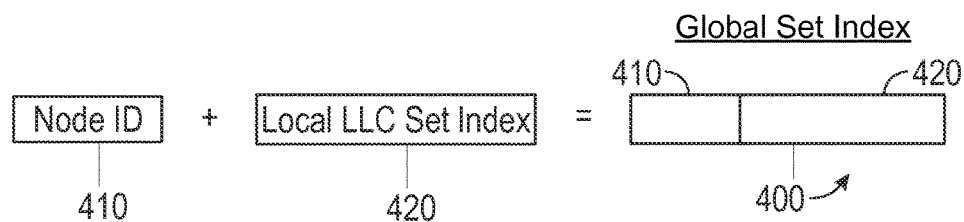
FIG. 4A is a block diagram of a set index for a shared cache memory accordance with an embodiment.

Referring now to FIG. 4A, shown is a block diagram of a set index for a shared cache memory accordance with an embodiment. As shown FIG. 4A, global set index 400 is formed of a node ID field 410 and a local set index field 420. Using these constituent fields, a global set index 400 is generated. Generation of this set address (which corresponds to an access address used to access one or more selected portions of a shared cache memory) may take place in an access generator of a cache controller or a core agent of a core; however this function may occur in different locations in other embodiments.

As shown in FIG. 4A, the global set index of the LLC slices equals the node ID combined with a local set index. This set addressing mode is active in a shared mode of LLC slice organization.

In an embodiment, a request address is received with a tag portion, an index portion that has a width of $\log_2$ (totalSetNum) and a block offset portion that has a width of $\log_2$ (blockSize). Instead using group addressing mode operation described herein an access request address includes a tag portion, an index portion that has a width of $\log_2$ (totalSetNum/groupNum) and which includes at least a portion of a node ID, and an offset portion that has a width of $\log_2$ (blockSize).

Figure 4B:
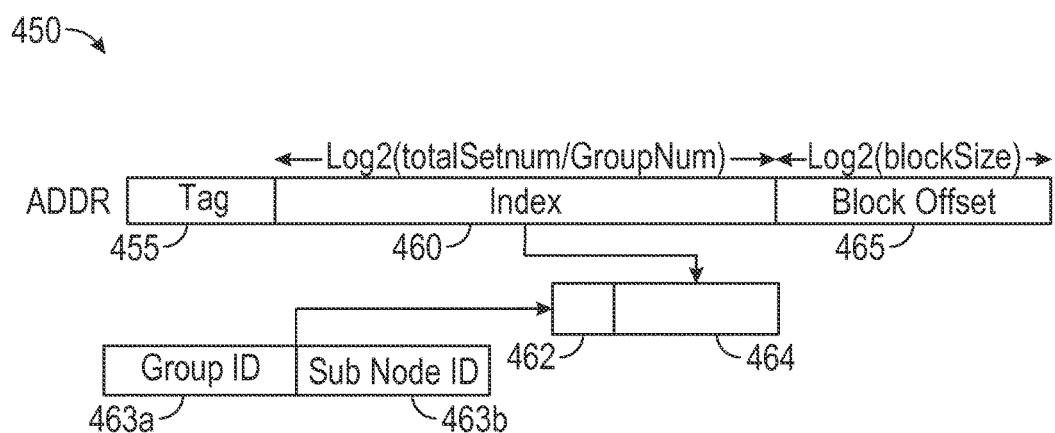
FIG. 4B is an access address generated using a global set index in accordance with an embodiment of the present invention.

Referring now to FIG. 4B, shown is an access address generated using a global set index in accordance with an embodiment of the present invention. More specifically, FIG. 4B shows an access address 450 formed of a tag field 455, an index field 460, and an offset field 465. As seen, index field 460 itself is formed of a node portion 462 and an index portion 464. Furthermore, node portion 462, which corresponds to a node ID, itself is formed of a group ID sub-field 463a and a sub-node ID sub-field 463b. Thus in an embodiment, the node ID may be formed of constituent parts including a first field (to store a group ID) and a second field (to store a sub-node ID). In turn, index portion 464 includes index information obtained from a memory request address. Thus in a particular embodiment, the node ID itself may be divided into 2 parts: a group-ID sub-field and a sub-node ID sub-field.

Of course while this particular addressing scheme is shown for purposes of illustration, understand that a dynamic addressing scheme may take other forms in different embodiments as different node ID schemes are possible.

Compared to a conventional LLC index, a request address contributes fewer bits to the LLC index, and the node ID contributes the group ID. As seen in the embodiment of FIG. 4B, the node ID forms the remaining most significant portion of the LLC set index.

Combining the index algorithm with global LLC slice addressing mode, nodes having the same group ID form a group to share their LLC slices, without any change to an existing communication fabric. Using the index algorithm described here, the number of LLC cache slices to be shared (referred to herein as a group number) can be changed by adjusting the group ID field width. Such changes may be dynamically performed, e.g., by a cache controller or other control logic based on dynamic operating conditions.

Further, when the group ID sub-field width is 0, LLC slices are switched to a shared mode; and when the sub-node ID sub-field width is 0, all LLC slices are switched to private dynamically.

Embodiments enable adjustments to cache groupings based on real-time profiles to match the workload characteristics. For example, when the group number is decreased, each core has a larger LLC capacity and more data can be shared. Instead when LLC miss traffic is low and coherent traffic is low, the group number can be increased which causes data to be stored in LLC slices nearby to the requestor to shorten access latency.

Thus LLC grouping mode can be dynamically adjusted. Further the groups may be arranged such that a group is formed of spatially close LLC slices (nearby the requestor) to shorten access latency. Embodiments enable workload-based improvements in uncore communication fabric efficiency. In addition, embodiments dynamically optimize the LLC organization for different LLC miss rates.

Embodiments apply equally to other group sharing modes. If a given node ID is allocated in one group, the same node ID is mapped to the same sub-node (0) in other groups, because LLC set addressing mode of each group is identical. Thus embodiments may further decrease the coherent traffic among the groups. For example, when a line of an LLC slice is written, probe-invalidate messages are only sent to the nodes with the same sub-node ID of other groups, not all the remaining nodes, which saves uncore interconnection bandwidth.

Referring back to FIG. 2, in the embodiment shown the 16 cores are divided into 4 groups, in which the most significant 2 bits of the node ID are used as group ID (and the lower significant 2 bits are the sub-node ID). In each group according to this example, 4 cores share their LLC slices which enables each core to access a larger LLC capacity. In addition, the 4 cores of a group are neighboring, which guarantees that request data is not placed on remote nodes. Moreover, coherent traffic only occurs among nodes with the same sub-node ID (least significant 2 bits of node ID), and thus a cache coherency message such as a probe/snoop message is only sent to at most 3 target nodes.

As described above, the number of groups may be dynamically adjusted to realize better performance for different workloads. For example, if workloads on 16 cores have a small footprint and no data shared, the 16 cores could be divided into 8 groups or even 16 groups. Instead if workloads on the 16 cores have a large footprint and more data shared, the 16 cores could be divided into 2 groups or even 1 group. As such, an LLC indexing algorithm in accordance with an embodiment enables dynamic grouping adjustment with high flexibility and low overhead.

Figure 5:
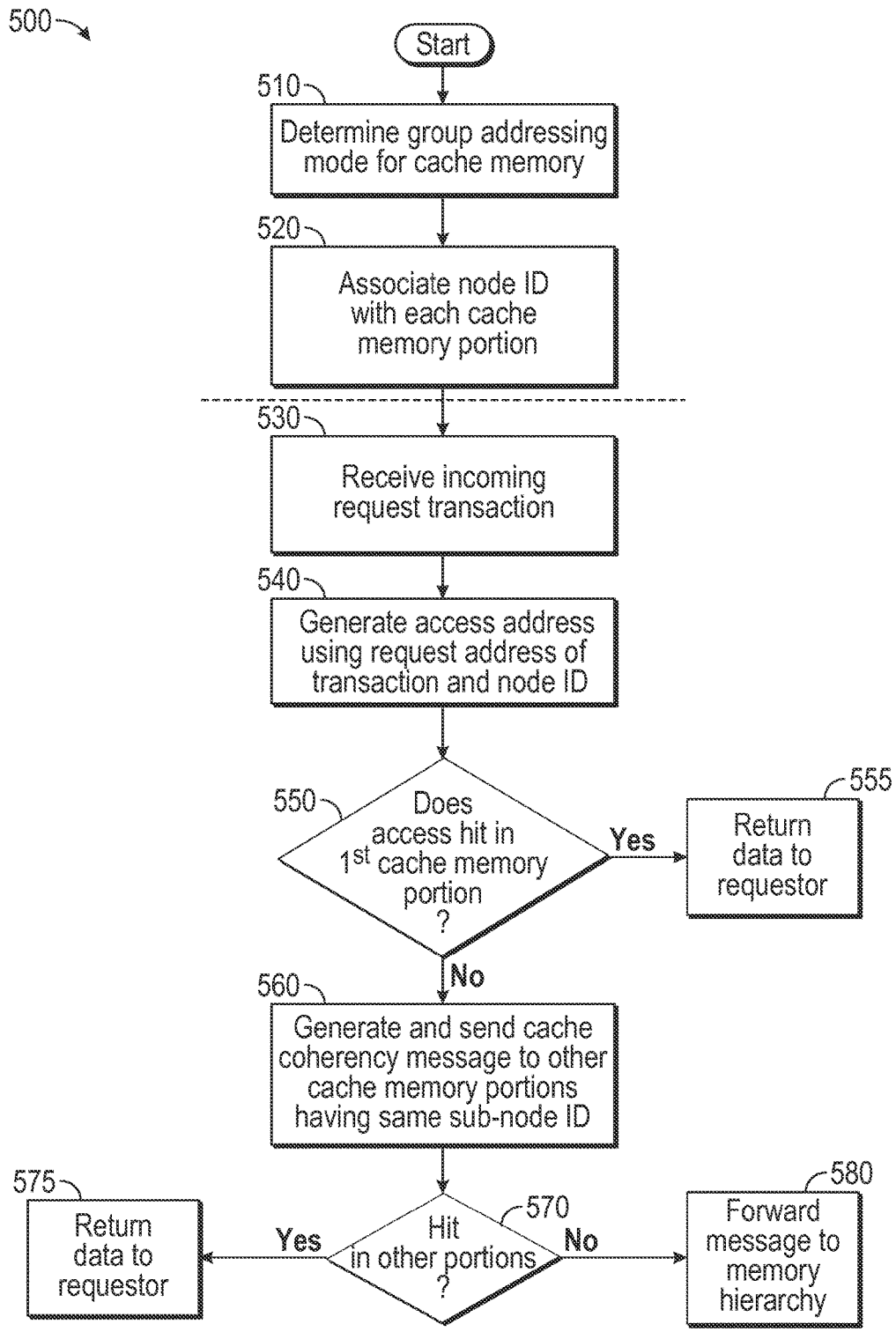
FIG. 5 is a flow diagram of a method in accordance with an embodiment of the present invention.

Referring now to FIG. 5, shown is a flow diagram of a method in accordance with an embodiment of the present invention. Specifically, FIG. 5 shows a method for selecting a group addressing mode and processing cache memory transactions using the addressing scheme indicated by the selected group addressing mode. In certain implementations, various portions of FIG. 5 may be performed by different components of a processor, including a cache controller, logic within a core such as a core agent and local cache circuitry (e.g., a local cache controller) as well.

As seen in FIG. 5, method 500 begins by determining a group addressing mode for a cache memory (block 510). This determination may be based on static or dynamic values. For example, upon powering up of a system on reset, a default group addressing mode may be selected for the LLC based on configuration values, e.g., as indicated within a basic input/output system (BIOS) or other system software. In some implementations BIOS may store and provide a default system value, indicating a preference for a shared LLC (and possibly the group number) or private LLC slices. Alternately or in addition a type of group addressing mode may be selected based on execution of a particular application, as certain applications may create workloads that are more appropriate for a private cache or shared cache memory arrangement. Based on statistical or other information from previous executions of the application, upon application initiation, the LLC can be appropriately configured for private mode or shared mode (and a selected number of nodes per group).

Still referring to FIG. 5, based on this determination at block 510, control passes next to block 520 where a node ID may be associated with each cache memory portion. In an embodiment, a central control logic such as a cache controller may generate node IDs for each node of the processor. These node IDs may be stored in a node ID mapping table of the cache controller. Furthermore, the cache controller may communicate the node IDs to the appropriate circuitry including the LLC slices and the cores. In this way, when generating transactions these components understand the arrangement of the system. At this point, the cache is appropriately configured for operation.

Still referring to FIG. 5, the remaining operations may be performed when an incoming request transaction is received at block 530. Responsive to this incoming request transaction, which may be received in the cache controller from a remote agent (for example), an access address may be generated (block 540). More specifically, this incoming request transaction includes a request address in the normal addressing scheme of the system (that is, this request address is unaware of the node ID-based group addressing described herein). Accordingly at block 540 an access address can be generated that uses both this incoming request transaction request address and the node identifier. In an embodiment, the access address may be generated like the address shown in FIG. 4B. Next at diamond 550 it can be determined whether the access address hits in a first cache memory portion. If so, control passes to block 555 where the requested data obtained from the hit address is returned to the requester.

Otherwise, if an access miss occurs in this first cache memory portion, control instead passes to block 560, where a cache coherency message is generated and sent. More specifically, this cache coherency message is sent to other cache memory portions that have a common sub-node identifier with the first cache memory portion. Note that this cache coherency message can be generated by different components such as a local control logic associated with the first cache memory portion. Alternately, a miss in the first cache memory portion can be indicated to a global cache controller which in turn generates the cache coherency traffic.

Still referring to FIG. 5, next it can be determined at diamond 570 whether any of the targets of the cache coherency messages (namely the other cache memory portions having the same sub-node ID) include the data. If so, at block 575 the requested data may be returned to the requester. Otherwise, at block 580 the request message can be forwarded to further portions of a memory hierarchy such as a system memory to obtain the requested data (note that the request address in this request is the original request and not the node ID-based address). Although shown at this high level in the embodiment of FIG. 5, understand the scope of the present invention is not limited in this regard.

Figure 6:
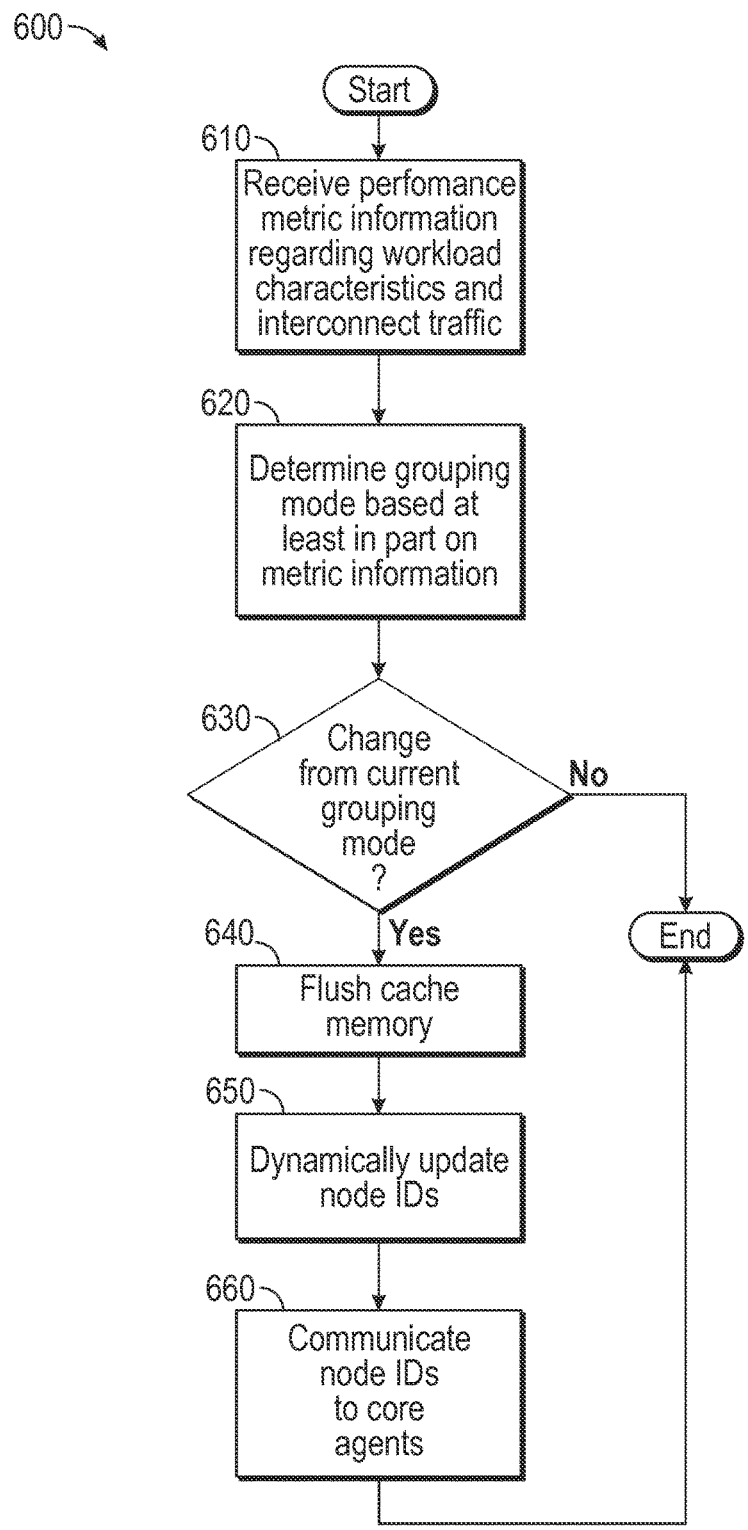
FIG. 6 is a flow diagram of a method for dynamically controlling a cache memory in accordance with an embodiment of the present invention.

Referring now to FIG. 6, shown is a flow diagram of a method for dynamically controlling a cache memory in accordance with an embodiment of the present invention. As seen in FIG. 6, method 600 may be used to dynamically control cache memory arrangement to be shared or private mode and may be performed, in an embodiment, by a global cache controller.

Method 600 begins by receiving performance metric information regarding workload characteristics and interconnect traffic (block 610). Such workload characteristics include large or small footprints, and/or shared or private data sets, in an embodiment. The performance information includes LLC access rates, LLC miss rates, state statistics of cache lines, in an embodiment. In an embodiment, the performance metric information may be received by one or more cores, e.g., from performance monitoring units of such cores. In turn, the interconnect traffic information may be received from an interconnect control logic.

A grouping mode may be determined based at least in part on this information (block 620). For example, a cache controller may be configured to select a group mode with a relatively small number of nodes in each group (e.g., 2) if the interconnect traffic is low and the workload is a private small data footprint. Instead if the interconnect traffic is high and the workload is a shared large data footprint performance workload, a group mode with a larger number of nodes in each group (e.g., 4 or more) may be established. Alternately, based on profiling information that indicates that most cores only need a small LLC capacity, a private mode may be configured. In private mode, requested data of a core may be cached in the local LLC slice to reduce access latency and save power for data transfer on interconnect structures.

Still referring to FIG. 6, next at diamond 630 it is determined whether this grouping mode is a change from the current grouping mode. If not, no further action is taken. Otherwise on a change to the group addressing mode, control passes to block 640 where the cache memory may be flushed. That is, because a different addressing scheme will be used going forward, the cache memory is flushed to ensure that no inconsistency or non-coherency occurs.

Then at block 650 the node IDs may be dynamically updated based on the grouping mode. In an embodiment, this update includes updating the node ID mapping table in the cache controller and communicating the new node IDs to the various nodes themselves (block 660) where the values may be stored in a volatile storage of the node (e.g., within a cache logic or core agent), so that they can be used in generating cache access addresses. Although shown at this high level in the embodiment of FIG. 6, understand the scope of the present invention is not limited in this regard.

Figure 7:
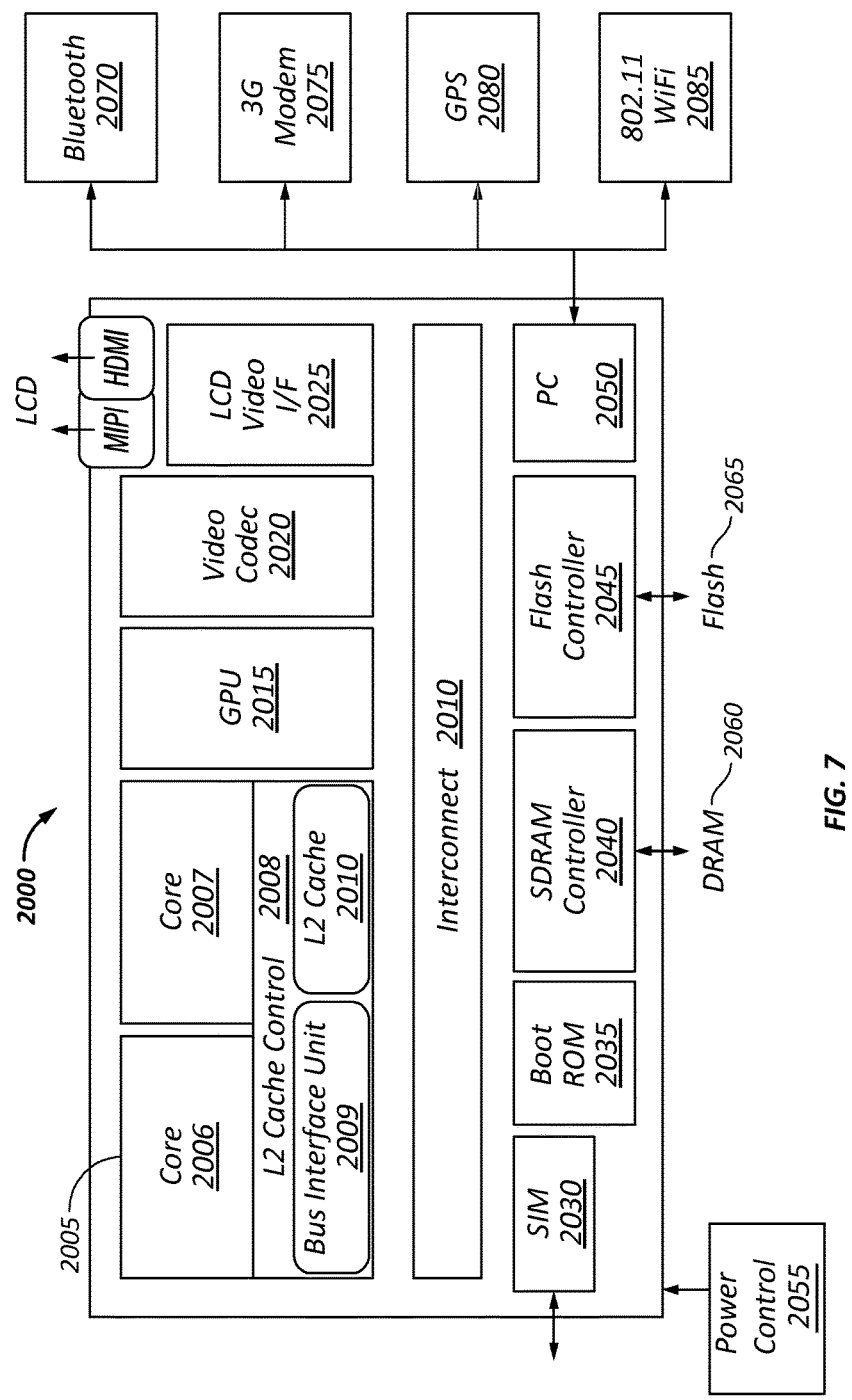
FIG. 7 is a block diagram of an embodiment of a system on-chip (SOC) design in accordance with an embodiment of the present invention.

Turning next to FIG. 7, an embodiment of a system on-chip (SOC) design in accordance with an embodiment is depicted. As a specific illustrative example, SOC 2000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 2000 includes 2 cores—2006 and 2007. Similar to the discussion above, cores 2006 and 2007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 2006 and 2007 are coupled to cache control 2008 that is associated with bus interface unit 2009 and L2 cache 2010 to communicate with other parts of system 2000. Interconnect 2010 includes an on-chip interconnect, such as an IOSF, AMBA, or other interconnect discussed above, which potentially implements one or more aspects of the described herein.

Interconnect 2010 provides communication channels to the other components, such as a Subscriber Identity Module (SIM) 2030 to interface with a SIM card, a boot ROM 2035 to hold boot code for execution by cores 2006 and 2007 to initialize and boot SOC 2000, a SDRAM controller 2040 to interface with external memory (e.g. DRAM 2060), a flash controller 2045 to interface with non-volatile memory (e.g. Flash 2065), a peripheral controller 2050 (e.g. Serial Peripheral Interface) to interface with peripherals, video codecs 2020 and Video interface 2025 to display and receive input (e.g. touch enabled input), GPU 2015 to perform graphics related computations, etc. Any of these interfaces may incorporate aspects described herein.

In addition, the system illustrates peripherals for communication, such as a Bluetooth module 2070, 3G modem 2075, GPS 2080, and WiFi 2085. Also included in the system is a power controller 2055. Note as stated above, a UE includes a radio for communication. As a result, these peripheral communication modules are not all required. However, in a UE some form a radio for external communication is to be included.

The following examples pertain to further embodiments. In one example, an apparatus includes a first portion of a cache memory to be associated with a first core, where the first cache memory portion is to be part of a distributed cache memory and to be dynamically controlled to be one of a private cache memory for the first core and a shared cache memory shared by a plurality of cores including the first core, according to an addressing mode.

In an embodiment, a cache controller is to dynamically control the first cache memory portion. The cache controller may dynamically control the first cache memory portion based at least in part on a workload executed on the first core, and further the cache controller may dynamically modify the addressing mode. The cache controller may receive a request address with a request, and generate an address to access the first cache memory portion using the request address and a node identifier associated with the first core. In an embodiment, the address comprises a tag portion, an index portion including the node identifier and a portion of the request address, and an offset portion. The node identifier includes, in an embodiment, a group identifier to identify a group of cores including the first core and a sub-node identifier to identify the first core, wherein the node identifier is a unique number and the group identifier and the sub-node identifier are non-unique numbers.

When the first cache memory portion is configured in a shared cache memory mode, the cache controller may send a cache coherency message to only cores of the plurality of cores having a common sub-node identifier with the first core. And, the cache controller may dynamically adjust the group identifier to dynamically control the first cache memory portion to be one of the private cache memory and the shared cache memory. In an embodiment, a width of the group identifier and a width of the sub-node identifier are variable based on the dynamic control. Also, the cache controller may dynamically change a node identifier of a first node including the first core and the first cache memory portion when the first cache memory portion is changed from the private cache memory to the shared cache memory.

In another example, a SoC comprises: a plurality of nodes, each node to be associated with a node identifier and to include at least one core and at least one cache slice; and a control logic to receive performance metric information, determine a grouping mode for a cache memory to be formed of the cache portions of each of the plurality of nodes based at least in part on the performance metric information, and to dynamically change the node identifier of at least some of the plurality of nodes responsive to a change in the grouping mode. The control logic may flush the cache memory responsive to a change in the grouping mode, and the node identifier may be transparent to system software. In an embodiment, the at least one cache portion is to be a private cache for the at least one core in a first grouping mode and to be a shared cache in a second grouping mode.

In one example, the control logic is to determine the grouping mode to be the second grouping mode in which N of the plurality of nodes are to operate with the shared cache when the performance metric information indicates a miss rate greater than a first threshold, and to determine the grouping mode to be the second grouping mode in which M of the plurality of nodes are to operate with the shared cache when the performance metric information indicates a miss rate less than the first threshold, where N is less than M.

In the second grouping mode, a first group of nodes are to share the at least one cache portion of each of the first group of nodes, in an embodiment. A distributed cache memory may include the at least one cache portion of each of the plurality of nodes, where the at least one cache portion of each of the plurality of nodes is dynamically controlled to be one of a private cache memory of the at least one core and a shared cache memory shared by some of the plurality of nodes.

In an embodiment, the control logic is to receive a request address with a request, and to generate an address to access a first cache portion using the request address and a node identifier associated with a first node including the first cache portion. The address comprises a tag portion, an index portion including the node identifier and a portion of the request address, and an offset portion, and the node identifier includes a group identifier to identify a group of nodes and a sub-node identifier to identify the first node, where the node identifier is a unique number and the group identifier and the sub-node identifier are non-unique numbers.

In another example, a method comprises: receiving an incoming request transaction in a system including a plurality of nodes; generating an access address using a request address of the incoming request transaction and a node identifier of a first node including a first core and a first portion of a LLC, where the node identifier is dynamically changed when a group addressing mode for the LLC changes; and accessing the first portion of the LLC using the access address.

In one example, the method further comprises determining the group addressing mode for the LLC based at least in part on one or more of performance metric information and system configuration information. Responsive to a group addressing mode change, the method includes associating a node identifier with each portion of the LLC and communicating the node identifier to each corresponding node, where the node identifier includes a group identifier and a sub-node identifier. And the method may further include generating the access address including a group identifier to identify a group of nodes including the first node and a sub-node identifier to identify the first node, where the node identifier is a unique number and the group identifier and the sub-node identifier are non-unique numbers. The method may also include generating and sending a cache coherency message to other LLC portions having the same sub-node identifier as the first node responsive to a miss in the first LLC portion. In an embodiment, the cache memory may be flushed responsive to a change to the group addressing mode.

In another example, a computer readable medium including instructions is to perform the method of any of the above examples.

In another example, an apparatus comprises means for performing the method of any one of the above examples.

According to another example, a system includes: a processor including a plurality of nodes, each having at least one core and a portion of a distributed cache memory, and a controller to dynamically update a node identifier for each of the plurality of nodes based at least in part on a grouping mode of the distributed cache memory. The system may further include a DRAM coupled to the processor. In an example, the controller is to dynamically control each portion of the distributed cache memory to be part of a shared cache memory in a first grouping mode and to be a private cache memory in a second grouping mode. The controller may receive a request address with a request to access a first distributed cache memory portion, and to generate an address to access the first distributed cache memory portion using the request address and a node identifier associated with a first node including the first distributed cache memory portion, the address including a tag portion, an index portion including the node identifier and a portion of the request address, and an offset portion.

Note that the above processor can be implemented using various means.

In an example, the processor comprises a SoC incorporated in a user equipment touch-enabled device.

In another example, a system comprises a display and a memory, and includes the processor of one or more of the above examples.

In yet another example, an apparatus comprises: a first node including a first cache slice and a first core; a second node including a second cache slice and a second core; and control logic to include the first cache slice and the second cache slice in a first group based on a common node identifier for the first and second nodes. The control logic is further to include the first cache slice in the first group and a second cache slice in a second group, which is private from the first group, based on distinct node identifiers for the first node and the second node. In an embodiment, the control logic is to dynamically change between the common node identifier and the distinct node identifier based on performance.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first portion of a cache memory and a first core, the first cache memory portion of a distributed cache memory, wherein the first cache memory portion is dynamically controlled to be one of a private cache memory for the first core and a shared cache memory shared by a plurality of cores including the first core, according to an addressing mode; and
a cache controller to dynamically control the first cache memory portion to dynamically change between the private cache memory and the shared cache memory, the addressing mode based at least in part on performance metric information from a performance monitoring unit of the first core.

2. The apparatus of claim 1, wherein the cache controller is to dynamically control the first cache memory portion based at least in part on a workload executed on the first core.

3. The apparatus of claim 1, wherein the cache controller is to dynamically modify the addressing mode.

4. The apparatus of claim 3, wherein the cache controller is to receive a request address with a request, and to generate an address to access the first cache memory portion using the request address and a node identifier associated with the first core.

5. The apparatus of claim 4, wherein the address comprises a tag portion, an index portion including the node identifier and a portion of the request address, and an offset portion.

6. The apparatus of claim 4, wherein the node identifier includes a group identifier to identify a group of cores including the first core and a sub-node identifier to identify the first core, wherein the node identifier is a unique number and the group identifier and the sub-node identifier are non-unique numbers.

7. The apparatus of claim 6, wherein when the first cache memory portion is configured in a shared cache memory mode, the cache controller is to send a cache coherency message to only cores of the plurality of cores having a common sub-node identifier with the first core.

8. The apparatus of claim 6, wherein the cache controller is to dynamically adjust the group identifier to dynamically control the first cache memory portion to be one of the private cache memory and the shared cache memory.

9. The apparatus of claim 8, wherein a width of the group identifier and a width of the sub-node identifier are variable based on the dynamic control.

10. The apparatus of claim 8, wherein the cache controller is to dynamically change a node identifier of a first node including the first core and the first cache memory portion when the first cache memory portion is changed from the private cache memory to the shared cache memory.

11. A system on a chip (SoC) comprising:
a plurality of nodes each having a node identifier and including at least one core and at least one cache portion; and
a control logic to receive performance metric information, determine a grouping mode for a cache memory formed of the cache portions of each of the plurality of nodes based at least in part on the performance metric information, and to dynamically change the node identifier of at least some of the plurality of nodes responsive to a change in the grouping mode, wherein the control logic is, in a second grouping mode, to form a first group having a subset of the plurality of nodes in which a shared cache includes the at least one cache portion of the subset of the plurality of nodes, the control logic to control a number of the plurality of nodes to be in the first group based on the performance metric information.

12. The SoC of claim 11, wherein the control logic is to flush the cache memory responsive to a change in the grouping mode.

13. The SoC of claim 11, wherein the node identifier is transparent to system software.

14. The SoC of claim 11, wherein the at least one cache portion is to be a private cache for the at least one core in a first grouping mode.

15. The SoC of claim 14, wherein the control logic is to determine the grouping mode to be the second grouping mode in which N of the plurality of nodes are to operate with the shared cache when the performance metric information indicates a miss rate greater than a first threshold, and to determine the grouping mode to be the second grouping mode in which M of the plurality of nodes are to operate with the shared cache when the performance metric information indicates a miss rate less than the first threshold, wherein N is less than M.

16. The SoC of claim 15, wherein in the second grouping mode the subset of the plurality of nodes are to share the at least one cache portion of each of the subset of the plurality of nodes.

17. The SoC of claim 11, further comprising a distributed cache memory including the at least one cache portion of each of the plurality of nodes, wherein the at least one cache portion of each of the plurality of nodes is dynamically controlled to be one of a private cache memory of the at least one core and a shared cache memory shared by some of the plurality of nodes.

18. The SoC of claim 11, wherein the control logic is to receive a request address with a request, and to generate an address to access a first cache portion using the request address and a node identifier associated with a first node including the first cache portion.

19. The SoC of claim 18, wherein the address comprises a tag portion, an index portion including the node identifier and a portion of the request address, and an offset portion, and wherein the node identifier includes a group identifier to identify the subset of the plurality of nodes and a sub-node identifier to identify the first node, wherein the node identifier is a unique number and the group identifier and the sub-node identifier are non-unique numbers.

20. A method comprising:
receiving an incoming request transaction in a system including a plurality of nodes;
generating an access address using a request address of the incoming request transaction and a node identifier of a first node including a first core and a first portion of a last level cache (LLC), wherein the node identifier is dynamically changed when a group addressing mode for the LLC dynamically changes between a private cache memory mode and a shared cache memory mode, the group addressing mode for the LLC determined based at least in part on performance metric information from a performance monitoring unit of at least one core of at least one of the plurality of nodes; and
accessing the first portion of the LLC using the access address.

21. The method of claim 20, further comprising determining the group addressing mode for the LLC further based at least in part on system configuration information.

22. The method of claim 20, further comprising responsive to a group addressing mode change, associating a node identifier with each portion of the LLC and communicating the node identifier to each corresponding node, wherein the node identifier includes a group identifier and a sub-node identifier.

23. The method of claim 22, further comprising generating the access address including a group identifier to identify a group of nodes including the first node and a sub-node identifier to identify the first node, wherein the node identifier is a unique number and the group identifier and the sub-node identifier are non-unique numbers.

24. The method of claim 23, further comprising generating and sending a cache coherency message to other LLC portions having the same sub-node identifier as the first node responsive to a miss in the first LLC portion.

25. The method of claim 2, further comprising flushing the LLC responsive to a change to the group addressing mode.

26. A system comprising:
a processor including a plurality of nodes, each having at least one core and a portion of a distributed cache memory, the processor further including a controller to dynamically control a node identifier for each of the plurality of nodes based at least in part on a grouping mode of the distributed cache memory, wherein the controller is to dynamically control each portion of the distributed cache memory to be in one of a first grouping mode or a second grouping mode, wherein the distributed cache memory portion is to be part of a shared cache memory in the first grouping mode and the distributed cache memory portion is to be a private cache memory in the second grouping mode; and
a dynamic random access memory (DRAM) coupled to the processor.

27. The system of claim 26, wherein the controller is to receive a request address with a request to access a first distributed cache memory portion, and to generate an address to access the first distributed cache memory portion using the request address and a node identifier associated with a first node including the first distributed cache memory portion, the address including a tag portion, an index portion including the node identifier and a portion of the request address, and an offset portion.

* * * * *